(No Model.)
B. F. GOODRICH & L. SMITH.
PNEUMATIC APPARATUS FOR GRAIN CONVEYERS AND ATTACHMENTS.
No. 323,317. Patented July 28, 1885.
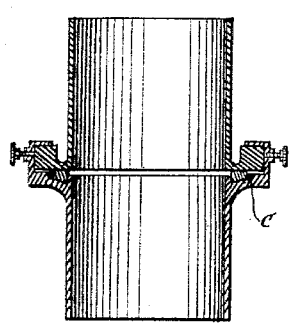
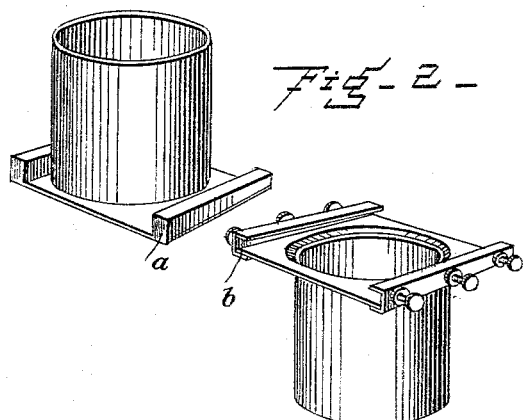
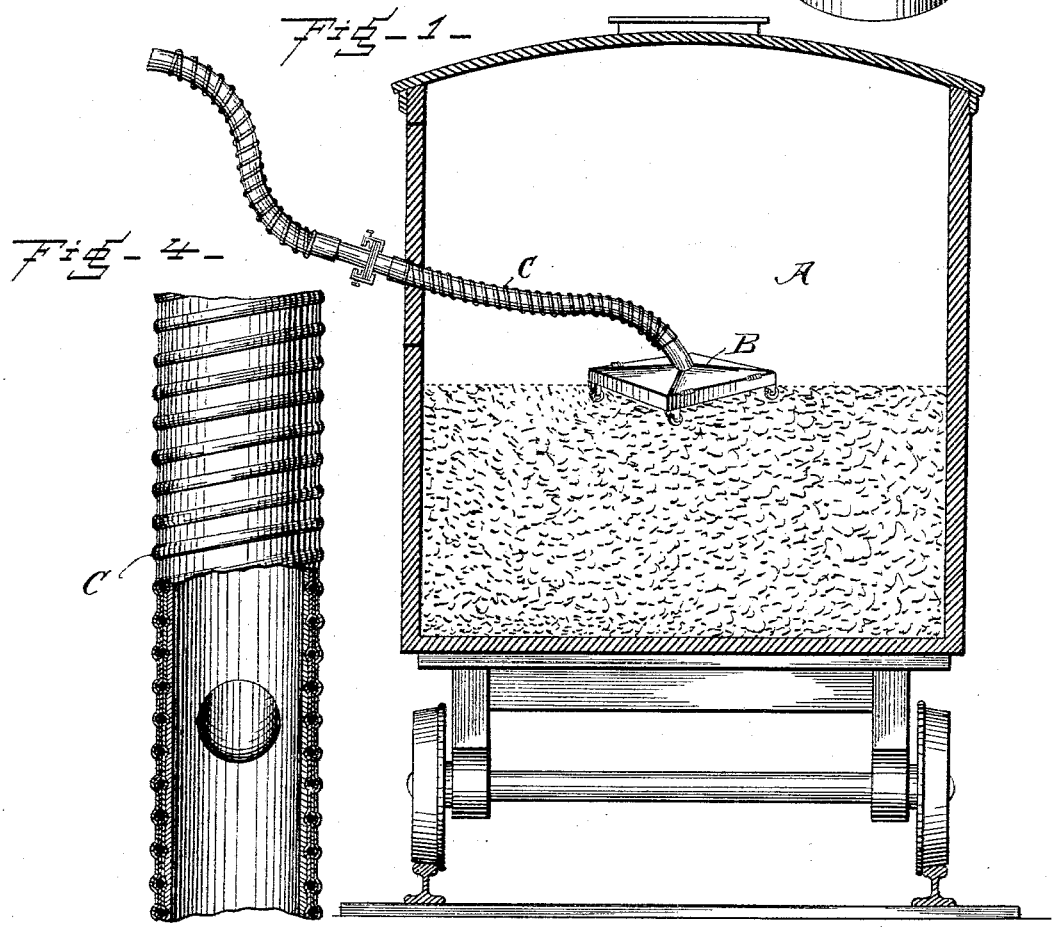

UNITED STATES PATENT OFFICE.

BENJAMIN F. GOODRICH, OF AKRON, OHIO, AND LYMAN SMITH, OF KANSAS CITY, MISSOURI.

PNEUMATIC APPARATUS FOR GRAIN-CONVEYERS AND ATTACHMENTS.

SPECIFICATION forming part of Letters Patent No. 323,317, dated July 28, 1885.

Application filed February 26, 1885. (No model.)

*To all whom it may concern:*

Be it known that we, B. F. GOODRICH, of Akron, county of Summit, and State of Ohio, and LYMAN SMITH, of Kansas City, in the county of Jackson and State of Missouri, have invented certain new and useful Improvements in Pneumatic Apparatus for Grain-Conveyers and Attachments; and we do hereby declare that the following is a full, clear, and exact description of the invention, which will enable others skilled in the art to which it appertains to make and use the same, reference being had to the accompanying drawings, and to the letters of reference marked thereon, which form part of this specification.

This invention has relation to means and apparatus for transferring grain, and has for its object to facilitate the removal of the mouth-piece and hose from one car to another and from place to place in the elevator-ship or other storage or carrying vessel, and is an improvement upon Patent No. 268,303, in which hose are used so that when the suction is up to a certain pressure they become flattened by collapse, and in this way interrupts the passage of grain through them. To remedy this defect and to readily connect and disconnect the hose are objects of this invention.

To this end our invention consists in making a hose the flexibility of which is equal to the ordinary kind, and at the same time is capable of withstanding considerable pressure from within and collapse from without, or from suction-pressure from within; secondly, in a peculiarly-arranged coupling for the connection of sections of hose whereby they may be readily coupled and uncoupled.

In the manipulation of our grain-transfer apparatus it is essential that all the parts be removed with the greatest facility for rapid portable purposes, and hence any improvement that tends to this end is of the greatest importance.

Referring to the drawings, each letter denotes like parts in the several figures, in which Figure 1 represents a railroad-car with our invention attached. Fig. 2 is a perspective view of our improved coupling device; Fig. 3, a section of the coupling when coupled together, and Fig. 4 a part plan and part sectional view of our improved hose.

A is the car, B the mouth-piece, and C the hose, which are flexible, as will be more fully hereinafter described.

D and E are the coupling-pieces, which are provided with flanges $a$ $b$, dovetailed and tapering to fit into each other. The object of tapering the flange-projection and its corresponding seat is to readily insert and remove one from the other, and also to provide for wear. As the joint becomes worn the two tapering faces will slide against each other, and thus preserve a tight joint. When the couplings are slipped together, they are immediately locked. In the face of one of the couplings we make a recess, $c$, preferably dovetailed, into which we insert a rubber gasket, and, if preferred, a wire ring or other binder may be driven in to secure it in position.

If necessary, bosses may be cast on the sides of the flanges, in which set-screws are inserted to bind the couplings together when in position. In use, however, these screws will hardly be found necessary, as the couplings will hold themselves.

The hose C is made of several thicknesses of material, as follows: The hose is made and vulcanized in the usual manner over hollow mandrels. The mandrel is first covered with a sheet of unvulcanized rubber, calendered to proper thickness, which serves as an air and water tight lining for the hose. Over this is placed a single ply of duck, covered with a friction-coat, as commonly prepared for the purpose. This duck is cut on the bias, and rolled down into place on the tube smoothly and carefully, so as to insure perfect contact with the tube. On this is placed a coil of spring wire—preferably brass—properly separated, and of a gage sufficiently heavy to cause the cotton and rubber fabric in which it is cased to yield and fold when the hose is bent, like the leather of a smith's bellows. This coil is securely held in place by another ply of duck, same as above described, being closely rolled and stitched down over and around the wire. Then over the whole is placed as a cover another sheet of rubber, which completes and makes air-tight and water-proof the whole. The hose is then wrapped in the usual manner, and vulcanized.

These hose may be at intervals of their length provided with branches, for the attachment of other sections, when so desired, or for attaching one or more mouth-pieces; but when not in use seals may be readily fixed to these branches, by which they are kept perfectly tight.

Having thus described our invention, what we claim is—

1. In a grain-conveying apparatus, a flexible hose, constructed substantially as described, whereby the section of the apparatus will not cause its collapse, in combination with the mouth-piece and coupling, substantially as set forth.

2. A hose-coupling having interlocking tapering flanges, substantially as described.

3. A hose-coupling provided with interlocking tapering flanges, one of which is provided on its face with a recess for the reception of a packing-piece, against which the smooth face of the other impinges in such manner as to form a tight joint, in the manner and for the purpose set forth.

4. A hose consisting of, first, an air-tight inner lining of rubber, covered by a lining of fibrous material, preferably cut bias, then a wrapping of spring-wire spirally wound around the inner linings at certain intervals, then covered with another ply of fibrous material closely rolled and stitched, then an outer covering over the whole, and then vulcanizing the hose, completing it in the manner and for the purpose set forth.

In testimony that we claim the foregoing as our own we affix our signatures in presence of two witnesses.

BENJAMIN F. GOODRICH.
LYMAN SMITH.

Witnesses:
PERCY W. LEAVITT,
ARTHUR WILLS.